(No Model.)

A. MOORE.
RICE SEPARATOR.

No. 243,944. Patented July 5, 1881.

WITNESSES:
A. Schehl.
C. Sedgwick.

INVENTOR:
A. Moore
BY Munn & Co.
ATTORNEYS.

N. PETERS, Photo-Lithographer, Washington, D. C.

UNITED STATES PATENT OFFICE.

ALONZO MOORE, OF BANGKOK, SIAM.

RICE-SEPARATOR.

SPECIFICATION forming part of Letters Patent No. 243,944, dated July 5, 1881.

Application filed April 2, 1881. (No model.)

*To all whom it may concern:*

Be it known that I, ALONZO MOORE, of Bangkok, Siam, have invented a new and Improved Centrifugal and Centripetal Rice-Separator, of which the following is a specification.

My improvements relate to machines for separating unhulled grains from hulled rice, chaff, stones, sticks, and other foreign matter from grain and seed, and for separating other materials.

The invention consists in a combination of screens and other devices forming an oscillating separator, as hereinafter described and claimed.

Figure 1:
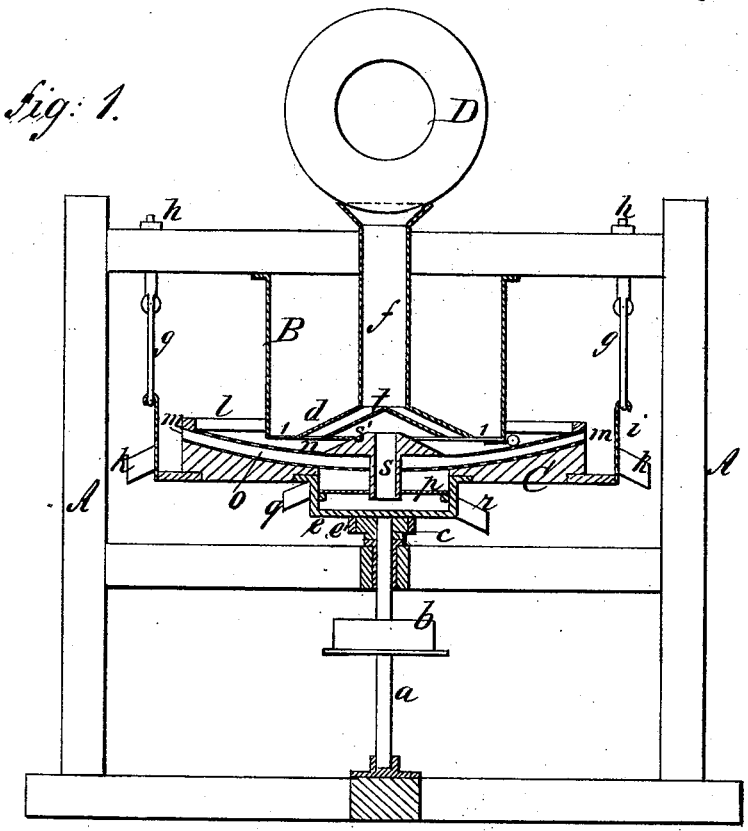
Figure 2:
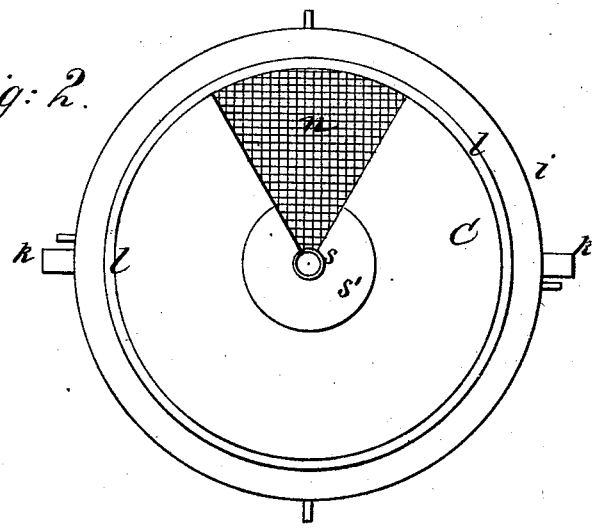
Figure 3:
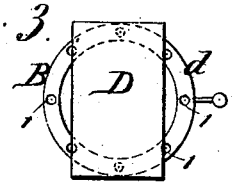

In the accompanying drawings, Figure 1 is a central vertical section of the machine. Fig. 2 is a plan view of the separator proper, and Fig. 3 is a plan view showing the hopper and blower.

Similar letters of reference indicate corresponding parts.

A is the frame of the machine, fitted at its lower portion with a vertical shaft, $a$, on which is a pulley, $b$, for connection of power, and carrying at its upper end an eccentric, $c$, for oscillating the screens, as hereinafter described.

B is a hopper suspended at the upper part of frame A and formed with a bottom, $d$, the central portion of which is raised in the form of a cone. In the outer portion of the bottom there are small holes 1 placed equidistant.

D is a fan-blower on frame A, from which a spout, $f$, passes to the apex of the conical bottom $d$.

C is a receiver, the same being a circular disk of wood, preferably having its upper surface formed concave, and having a central aperture.

$e$ is a box corresponding in size to the aperture in disk C, and attached to the disk to form a chamber beneath the aperture. On the under side of this box there is an annular flange, $e'$, fitting around the eccentric $c$.

The receiver C is suspended by links $g$, which are held by screw-bolts $h$, that pass through the upper cross-rails of the frame A. The bolts have nuts above the rails, so that the receiver can be leveled. Around the receiver is a rim or curb, $i$, that is attached to an annular flange projecting from the lower edge of disk C, so that there is a space between the rim and disk edge. From the curb $i$ spouts $k$ project for delivery of lighter material, as hereinafter described. The upper edge of the disk C is formed or fitted with a rim, $l$, beneath which there are openings $m$. Within this rim, and above the concave bottom of the receiver, is a coarse screen, $n$, of wire-cloth, the meshes of which are of suitable size for allowing the hulled rice to pass, and retaining the unhulled kernels or paddy. The concave upper surface of disk C is fitted also with coarse wire-cloth, as shown at $o$, which forms a friction-surface to move the grain.

The box $e$ that is beneath disk C is divided by a horizontal partition, $p$, and has two delivery-spouts, $q\,r$, the former above the partition, and spout $r$ below. From the partition $p$ a pipe, $s$, extends upward through the screen $n$, and there is a beveled ring, $s'$, around the upper end of the pipe resting on the screen. Above the pipe $s$ is fixed a cone, $t$, which is within the conical bottom $d$ of hopper B. There is a space between the cone $t$ and bottom $d$, which serves as a passage for the blast of air from pipe $f$, and the cone serves to direct and spread the air.

The operation is as follows: The rice from the hulling-mills is fed directly to the hopper B, and passing through holes 1 goes upon the screen $n$. The blast of air acts at this time to throw unhulled grains and other light matter outward to the edge of the separator. The screen $n$ separates the main bulk of the paddy or unhulled rice, and allows the hulled rice and smaller grains to pass. The hulled rice, being the heavier, is gradually worked to the bottom and through the screen, while a portion of the lighter materials goes over the rim to the space inclosed by curb $i$, and the balance goes to the lower part of the box $e$ by pipe $s$. The second separation occurs in the space between screen $n$ and disk C, from which the lighter materials pass, by the openings $m$, beneath rim $l$, while the hulled rice goes to the upper part of box $e$, and is finally delivery by spout $q$. The unhulled and refuse materials pass out of the machine by spouts $k\,r$.

The advantages obtained by this machine are that it will clean rice containing a large percentage of paddy, thus insuring a larger yield with less breakage from the hulling-stones. The rice can be run from the separator directly to the pearling-mills, and being properly separated, wear and tear on the mills is lessened. The separator delivers the rice in condition for use as food, without dependence on the pearling-machines for further cleaning, thus allowing use of the grain with all its nutritious portions.

The separator may be used for separating other materials of varying specific gravity.

The delivery-opening of the hopper may be fitted with a register-valve in form of a movable ring, for regulating the delivery by varying the size of opening.

Having thus described my invention, I claim as new and desire to secure by Letters Patent—

1. The combination of the suspended disk C, formed with a concave upper surface, box $e$, provided with partition $p$ and spouts $q\, r$, screen $n$, pipe $s$, beveled ring $s'$, feed-hopper, supplying the material to the screen, and mechanism for oscillating the disk, substantially as shown and described, for operation as set forth.

2. The hopper B, provided with conical bottom $d$ and feed-apertures, blower D, provided with tube $f$, and the cone $t$, combined with the oscillating receiver C and screen $n$, substantially as and for the purposes set forth.

3. The receiver C, suspended by links $g$, screen $n$, feed-hopper B, box $e$, formed with ring $e'$, operating-shaft $a$, and eccentric $c$, substantially as shown and described, combined for operation as set forth.

3. The box $e$, provided with partition $p$ and spouts $q\, r$, and the tube $s$, in combination with the centrally-apertured oscillating disk C, and screen $n$, substantially as shown and described.

The above specification of my invention signed by me this 8th day of January, 1880.

ALONZO MOORE.

Witnesses:
I. W. TORREY,
J. G. TORREY.